(12) United States Patent
Moncayo et al.

(10) Patent No.: US 12,265,162 B2
(45) Date of Patent: Apr. 1, 2025

(54) GEOMAGNETIC-AIDED PASSIVE NAVIGATION

(71) Applicant: Embry-Riddle Aeronautical University, Inc., Daytona Beach, FL (US)

(72) Inventors: Hever Moncayo, Port Orange, FL (US); Andrei Alberto Cuenca Demidova, Port Orange, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 10 days.

(21) Appl. No.: 18/473,115

(22) Filed: Sep. 22, 2023

(65) Prior Publication Data

US 2024/0103185 A1    Mar. 28, 2024

Related U.S. Application Data

(60) Provisional application No. 63/377,316, filed on Sep. 27, 2022.

(51) Int. Cl.
G01S 19/47    (2010.01)

(52) U.S. Cl.
CPC .................... *G01S 19/47* (2013.01)

(58) Field of Classification Search
CPC ........................................ G01S 19/47
See application file for complete search history.

(56) References Cited

U.S. PATENT DOCUMENTS 9,110,150 B2    8/2015    Kimishima

FOREIGN PATENT DOCUMENTS

| CN | 106982414 | 6/2020 |
|---|---|---|
| CN | 106979778 | 7/2021 |
| JP | 4176040 | 8/2008 |
| KR | 101912195 | 10/2018 |
| RU | 2466353 | 11/2012 |

(Continued)

OTHER PUBLICATIONS

Alken, Patrick, et al., "International Geomagnetic Reference Field: the thirteenth generation", Earth, Planets and Space 73(1), https://doi.org/10.1186/s40623-020-01288-x, (Feb. 11, 2021), 26 pages.

(Continued)

*Primary Examiner* — Mathew Franklin Gordon
(74) *Attorney, Agent, or Firm* — Schwegman Lundberg & Woessner, P.A.

(57) ABSTRACT

A machine learning approach can be used such as to synthesize geomagnetic maps having enhanced resolution versus lower resolution survey data. An on-board magnetometer can be used to measure a local magnetic field intensity, and a measured magnetic field intensity can be compared to the enhanced-resolution geomagnetic map. An indicium of a position of a vehicle on the enhanced-resolution geomagnetic map can be used, along with other sensor data, to provide an enhanced position estimate (or more generally, a state variable estimate) using a particle filtering technique supported by a deep reinforcement learning approach. Such a "geomagnetic-aided navigation" approach can be robust and need not rely on other navigational aids such as Global Navigation Satellite System (GNSS) or terrestrial transmitters.

20 Claims, 9 Drawing Sheets

(56) References Cited

FOREIGN PATENT DOCUMENTS

| TW | I225375 | 12/2004 |
|----|---------|---------|
| TW | I652492 | 3/2019  |

OTHER PUBLICATIONS

Campbell, Newton H., et al., "Data Augmentation for Intelligent Contingency Management Using Generative Adversarial Networks", AIAA 2022-0622 Session: Autonomy for Advanced Air Mobility I, (Dec. 29, 2021), 22 pages.

Cuenca, Andrei, et al., "A Geomagnetic-based Integrated Architecture for Dead- Reckoning Navigation", AIAA 2021-1227 Session: Advances in Feedback Control Architectures for Autonomous Systems VII Video abstract only, (Jan. 4, 2021), 1 page.

Cuenca, Andrei, "Geomagnetic Aided Dead-Reckoning Navigation", PhD Dissertations and Master's Theses. 551, (Nov. 2020), 83 pages.

Cuenca, Andrei, et al., "Geomagnetic Aided Navigation using Rao Blackwellized Particle Filter", AIAA 2023-1452 Session: GN&C Architectures for Autonomous Systems IV Video abstract only, (Jan. 19, 2023), 1 page.

Cuenca, Andrei, et al., "Q-Learning Model Covariance Adaptation of Rao-Blackwellized Particle Filtering in Airborne Geomagnetic Navigation", 2023 IEEE/ION Position, Location and Navigation Symposium (PLANS), (Apr. 24-27, 2023), 7 pages.

Davis, Jeremy, "Mathematical Modeling of Earth's Magnetic Field", Technical Note Jeremy Davis Virginia Tech, Blacksburg, VA 24061, (May 12, 2004), 21 pages.

Goodfellow, Ian J., et al., "Generative Adversarial Nets", Advances in Neural Information Processing Systems 27 (NIPS 2014), (Jun. 10, 2014), 9 pages.

Janssens, Nick, et al., "Computed Tomography 3D Super-Resolution with Generative Adversarial Neural Networks: Implications on Unsaturated and Two-Phase Fluid Flow", Materials doi:10.3390/ma13061397, (Mar. 19, 2020), 33 pages.

Lan, Rui, "Recovery of high-resolution magnetic field distribution inside the brain from limited MRI data using machine learning prior", University of Illinois at Urbana-Champaign Electrical & Computer Engr Thesis, (Apr. 22, 2019), 55 pages.

Ma, Xiaoyu, et al., "Super-Resolution Geomagnetic Reference Map Reconstruction Based on Dictionary Learning and Sparse Representation", Digital Object Identifier 10.1109/ACCESS.2020.2988483, (Apr. 17, 2020), 10 pages.

Vernaza, Paul, et al., "Rao-Blackwellized Particle Filtering for 6-DOF Estimation of Attitude and Position via GPS and Inertial Sensors", Proceedings 2006 IEEE International Conference on Robotics and Automation, 2006. ICRA 2006, (2006), 8 pages.

GEOMAGNETIC-AIDED PASSIVE NAVIGATION

CLAIM OF PRIORITY

This patent application claims the benefit of priority of Moncayo, et al., U.S. Provisional Patent Application No. 63/377,316, titled "Geomagnetic-aided Passive Navigation," filed on Sep. 27, 2022, which is hereby incorporated by reference herein in its entirety.

FIELD OF THE DISCLOSURE

This document pertains generally, but not by way of limitation, to position determination and navigation, and more particularly to passive navigation using a geomagnetic technique that can be used to augment or complement other navigation approaches.

BACKGROUND

Recent advances in commercial and military technologies have increased the dependence on precise positioning and navigation data usually provided by a Global Navigation Satellite System (GNSS) (e.g., Global Positioning System (GPS) or other satellite-based navigation system). However, threats to these systems (e.g., signal obstruction, drop-outs, erroneous data, jamming, or spoofing) are constantly evolving. This can result in in lost or inaccurate signals, even preventing airborne and maritime systems from nominal navigation. Alternative systems utilizing other GNSS, Iridium®, or Starlink® satellite systems exist but are also susceptible to similar threats or other denial attacks.

SUMMARY OF THE DISCLOSURE

Localization techniques using the Earth's magnetic field can provide an alternative or augmentation to other navigation approaches (such as GNSS, optical odometry, or inertial navigation approaches). An "anomaly" field defined by, for example, variations in the crustal magnetic field relative to a main geomagnetic field can provide navigation capability independent of weather or time-of-day. Such an approach can be referred to as "passive" because it does not require transmitting system elements unlike terrestrial and satellite-based active navigation systems such as LORAN, VHF Omni-Range (VOR), or GNSS, as illustrative examples. Accordingly, such a passive approach can provide greater immunity to outage or attack. A geomagnetic navigation approach involves use of prior magnetic measurements (e.g., magnetic survey) covering a geographic area of interest, which can be compiled into digital maps or other data structures and stored.

Generally, geomagnetic map data sets are aggregated from multiple survey missions, such as multiple satellite missions. Such map data sets can be mathematically generated, such as aggregating data from multiple sources and applying a spherical harmonic analysis using coefficients provided from the multiple sources. The present inventors have recognized, among other things, that generally available geomagnetic maps may be produced having lower spatial resolution that is desirable for use in geomagnetic-aided navigation, because surveys such as satellite missions cannot effectively capture frequency content corresponding to finer spatial features that exist due to localized anomalies in the geomagnetic field close to the surface of the Earth.

In one approach, aerial surveys of local areas could be performed separately from satellite-based surveys to obtain better resolution, but such an approach would represent an extensive, and consequently, expensive task to perform over a wide area of interest. The present inventors have recognized, among other things, that a machine learning approach can be used such as to synthesize geomagnetic maps having enhanced resolution versus lower resolution survey data. For example, a Generative Adversarial Network (GAN) neural network topology can form a generator neural network. The generator neural network can receive first geomagnetic map data corresponding to a first spatial resolution (e.g., lower resolution), and can output second geomagnetic map data having a spatial resolution that is higher than the first geomagnetic map data. Such an approach can be referred to as a "Super-Resolution" GAN (SRGAN) generative framework for artificially-generated geomagnetic mapping. In another aspect of the present subject matter, an indicium of a position of a vehicle on an artificially-generated geomagnetic map can be used along with other sensor data to provide an enhanced position estimate (or more generally, a state variable estimate) using a particle filtering technique supported by a deep reinforcement learning approach. In such an approach, adaptive covariance adjustments can be made, such as to control particle re-sampling within a particle filter forming a portion of a state variable estimator.

In an example, a technique, such as a machine implemented method can include receiving data representing a first geomagnetic map, applying a generator neural network to the received data representing the first geomagnetic map to generate a second geomagnetic map having a spatial resolution greater than the first geomagnetic map, using the second geomagnetic map, determining indicia of a position of a vehicle, and generating vehicular control data. In an example, the generating the vehicular control data comprises determining an estimated state variable using a fusion of data derived from one or more sensors and a locus of the vehicle determined using the second geomagnetic map.

In an example, the determined locus in the second geomagnetic map corresponds to a position at or near an equi-magnetic field contour. In an example, determining the estimated state variable includes using a particle filter, including controlling a covariance associated with a distribution of candidate positions as indicated by the particle filter. In an example, the first geomagnetic map and the second geomagnetic map comprise respective two-dimensional matrix representations of normalized magnetic anomaly data.

In an example, the normalized magnetic anomaly map comprises a mathematical representation of magnetic anomaly data samples of the geomagnetic survey. In an example, the generator neural network is established using an adversarial network training topology to form a generative adversarial network (GAN), the adversarial network training topology comprising a discriminator neural network to generate an indication as to whether a candidate second geomagnetic map provided by the generator neural network is classified as authentic or fake, the candidate second geomagnetic map having a spatial resolution greater than the first geomagnetic map received by the generator neural network.

In an example, a technique, such as a machine implemented method can include training a generator neural network using a generative adversarial network (GAN) topology, the technique comprising receiving data representing a group of first geomagnetic maps, applying the generator neural network to respective ones of the first geomagnetic maps to generate respective second geomagnetic maps having a spatial resolution greater than corresponding ones of the first geomagnetic maps, applying the respective second geomagnetic maps to a discriminator neural network to generate an indication as to whether a respective second geomagnetic map provided by the generator neural network is classified as authentic or fake, wherein the discriminator neural network is established using training data comprising authentic geomagnetic maps, and wherein the generator neural network is iteratively refined in response to respective indications as to whether the respective second geomagnetic maps are classified as authentic or fake.

In an example, a system can be configured to execute one or more techniques described herein. For example, the system can include at least one processor circuit, at least one memory circuit coupled to the processor circuit, the memory circuit comprising instructions that cause the at least one processor circuit to instantiate a state estimator, the instructions comprising instructions to receive data representing a first geomagnetic map, apply a generator neural network to the received data representing the first geomagnetic map to generate a second geomagnetic map having a spatial resolution greater than the first geomagnetic map, using the second geomagnetic map, determine indicia of a position of a vehicle, and in response, generate an estimated state variable for use in controlling the vehicle. For example, the system can include or can be a vehicular control system to receive the estimated state variable, and to generate one or more of a command to adjust an attitude of the vehicle or a command to adjust a steering of the vehicle.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A and FIG. 2B illustrate two-dimensional magnetic geomagnetic field representations, where

FIG. 6B generally correlates with features shown in FIG. 6C, and the images of FIG. 6A and FIG. 6C were not used in the corpus of training data used to establish the generator neural network in the SRGAN instance used for generation of FIG. 6B.

FIG. 7B generally correlates with features shown in FIG. 7C, and the images of FIG. 7A and FIG. 7C were not used in the corpus of training data used to establish the generator neural network in the SRGAN instance used for generation of FIG. 7B.

DETAILED DESCRIPTION

A navigation system for a vehicle such as a manned or unmanned aircraft can include use of geomagnetic data, such as using magnetometry to augment information provided by other sensors. As shown and described herein, a Generative Adversarial Network (GAN) topology can be used to establish a generator neural network. Such a neural network can be used to provide an enhanced representation of geomagnetic data, such as enhancing a resolution of a lower-resolution source map. A navigation system architecture can include or use an adaptive sensor fusion approach to provide navigation using Earth magnetic anomalies in combination with other sensing modalities. For example, a navigation system architecture can include an Inertial Navigation System (INS) position estimator with bias correction that is augmented using synthetic super-resolution geomagnetic map data.

Figure 1:
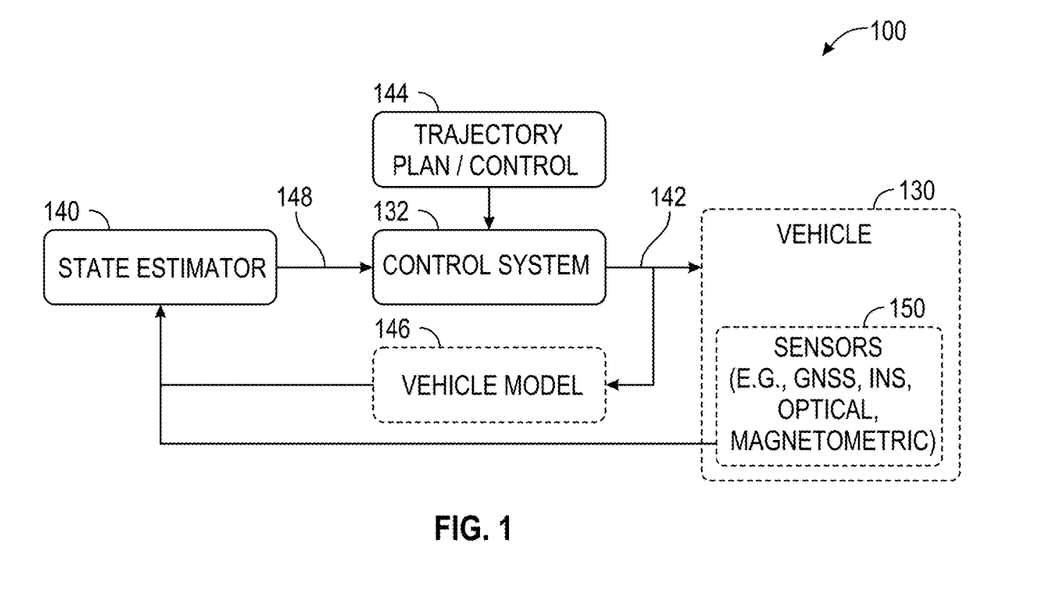
FIG. 1 illustrates generally an example comprising an automatic control architecture, such as can include or a use a geomagnetic aided navigation scheme as shown and described herein.

FIG. 1 illustrates generally an example comprising an automatic control architecture 100, such as can include or a use a geomagnetic aided navigation scheme as shown and described herein. The architecture 100 can be implemented as an embedded control system such as located on or within a vehicle 130 such as an aircraft. Such an architecture can include one or more processor circuits or other execution units such as coupled with one or more associated memory circuits, or the techniques described herein can be implemented in one or more application-specific or field-programmable circuits such as an Application Specific Integrated Circuit or Field Programmable Gate Array. Such circuitry can include general purpose processor circuitry or vector compute circuitry such as formed using one or more Graphics Processor Units (GPUs). The automatic control architecture 100 can include, use, store, or generate a trajectory plan 144 or other control input, such as provided to a vehicle (e.g., flight) control system 132. The trajectory plan can include a mission profile (e.g., a two-dimensional or three-dimensional representation of an intended trajectory) or can represent commanded trajectory inputs such as directional changes, altitude changes, or the like. Generally, the control system 132 provides commands represented in control data 142 or signals to actuate control elements of the vehicle 130, such as flight control surfaces or other steering elements, or propulsion, as illustrative examples. The control system 132 can form a closed-loop structure, such as receiving sensed information from one or more sensors 150 located on or within the vehicle 130. Data representative of the one or more sensors 150 can be provided to a state estimator 140. For example, the state estimator 140 can receive control data 142, such as processed in view of a vehicle model 146 (e.g., a vehicle dynamics model), along with data from the one or more sensors 150, and a corresponding estimate of one or more state variables 148 can be provided to the control system 132. As shown and described herein, such state variables can include indicia of position or other variables (e.g., vectors or other values representing velocity, orientation, or the like). Examples of state variables can include (but are not limited to): position variables such as a three-dimensional position of the aircraft in space (latitude, longitude, altitude), velocity variables such as a two-dimension or three-dimensional velocity vector, such as in a North-East-Down reference frame, attitude, such as describing an orientation of an aircraft given by pitch, roll, and yaw angles, or angular rates, such as indicative of velocities around defined pitch, roll, or yaw axes. As an illustration, an Extended Kalman Filter (EKF) or other estimator can be used, such as using data from one or more inertial sensors to implement an Inertial Navigation System (INS). The approaches described herein can augment an INS, such as incorporating (e.g., fusing) geomagnetic data with other sensed data to enhance a position estimate, such as using a trained machine learning model instance as a portion of the control system 132 or state estimator 140.

Figure 2A:
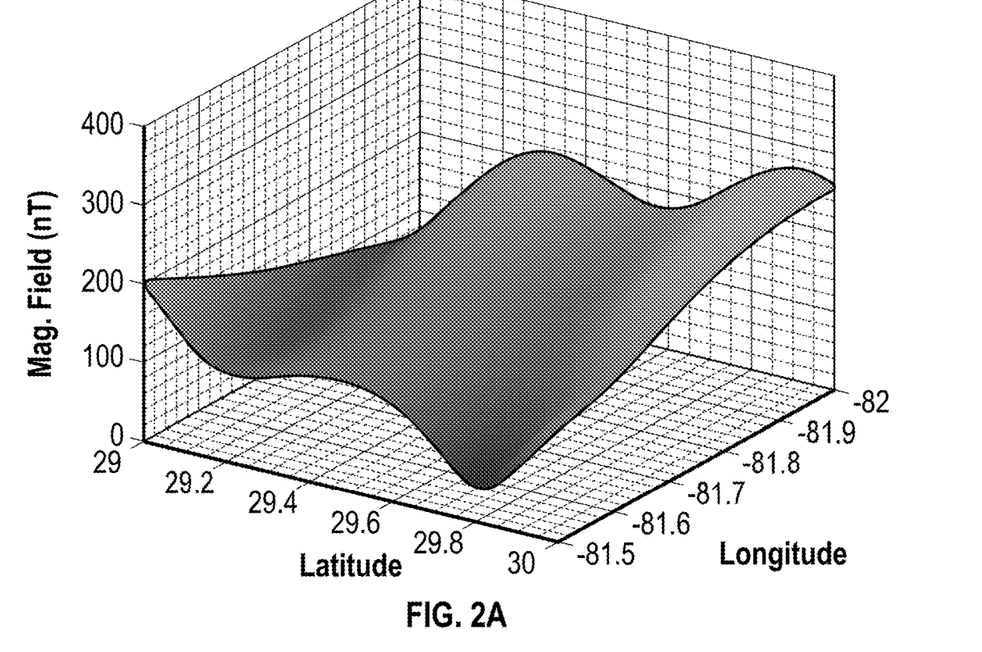
FIG. 2A shows an illustrative example of a low-resolution map obtained from a mathematical model based on satellite data as compared to FIG. 2B, which shows a map obtained from an aerial survey of the same area.
Figure 2B:
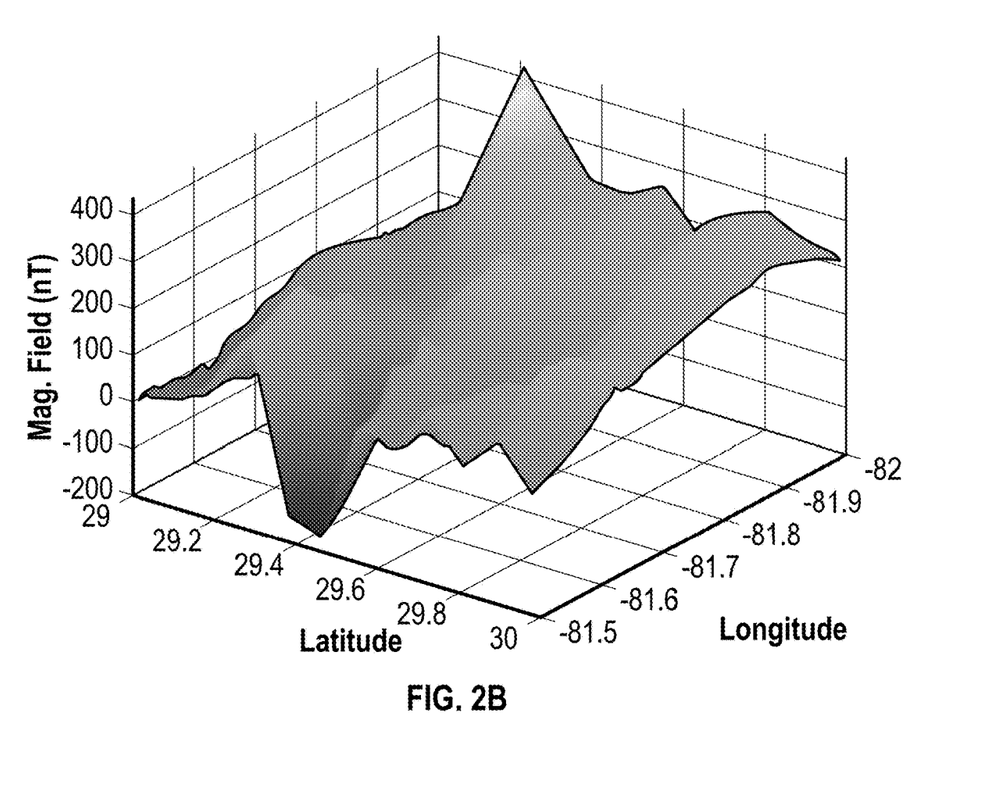

FIG. 2A and FIG. 2B illustrate two-dimensional magnetic geomagnetic field representations, where FIG. 2A shows an illustrative example of a low-resolution map obtained from a mathematical model based on satellite data as compared to FIG. 2B, which shows a map obtained from an aerial survey of the same area. Generally, the navigation architecture (e.g., system or technique) as described in this document can include synthetic geomagnetic map generation, such as using an image "super-resolution" technique based on a Generative Adversarial Network (GAN) architecture. A GAN architecture uses a neural network model to generate higher-resolution data by leveraging sample inputs. As shown and described below in the illustrative example of FIG. 4A, a GAN architecture generally comprises two neural networks, learning in competition with each other: a generator neural network and a discriminator neural network whose purpose, respectively, is to map random noise to samples and to discriminate between real and generated samples. Formally, the GAN optimization objective can be posed as a Nash equilibrium within a two-player min-max problem. During the training process, GANs attempt to understand the latent process that produced the provided training data. Use of GAN-based approach can reduce or eliminate a need for extensive geomagnetic surveys. For example, using a GAN-based deep-learning approach, the present geomagnetic-aided navigation approach can include use of a trained model instance generate higher-resolution maps (such as more closely approximating the actual "ground truth" aerial survey map shown in the illustrative example of FIG. 2B) from available lower-resolution geomagnetic data (with a corresponding lower-resolution map used as an input as shown in FIG. 2A).

Figure 3:
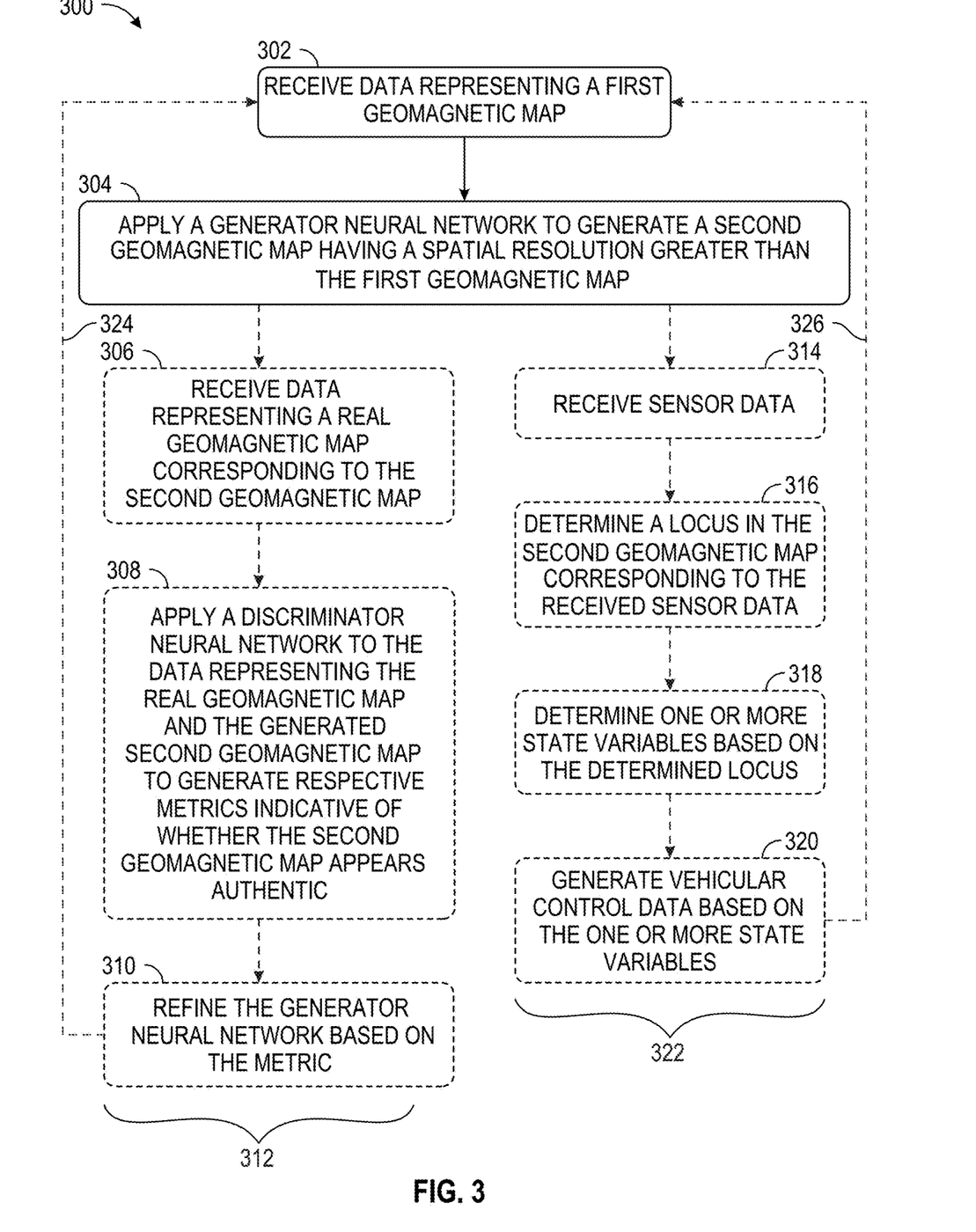
FIG. 3 illustrates generally a technique, such as a machine-implemented method, for generating a geomagnetic map using a neural network, such as to provide an enhanced geomagnetic map for navigational use, based on a lower-resolution source map.

FIG. 3 illustrates generally a technique 300, such as a machine-implemented method, for generating a geomagnetic map using a neural network, such as to provide an enhanced geomagnetic map for navigational use, based on a lower-resolution source map. Two flows are shown in the illustrative but non-limiting example of the technique 300 of FIG. 3, including a generator neural network training arm 312 and a vehicular control (e.g., navigation) arm 322. The two arms 312 and 322 need not be implemented on the same physical hardware. For example, a cloud compute facility or training cluster of processing units can be used to implement the training arm 312, such as to establish a generator neural network for use as a model instance in another system, such as embedded in a portion of a geomagnetic-aided navigation system providing the operations shown in the vehicular control arm 322.

Generally, in each of the training arm 312 or the vehicular control arm 322 can receive data representing a first geomagnetic map at 302. Such a geomagnetic map can include lower-resolution image data such as a normalized magnetic anomaly map based on a geomagnetic survey, or a mathematical representation thereof, or training data corresponding to such a magnetic anomaly map (for use in the training arm 312). At 304, a generator neural network can be used to generate (e.g., synthesize) a second geomagnetic map having a spatial resolution greater than the first geomagnetic map.

In the training arm 312 context, such synthesis can be used as an input to a discriminator neural network as discussed below. For example, at 306, data can be received representing a real geomagnetic map (or a modified representation thereof) having a resolution similar to or greater than the higher-resolution second geomagnetic map, for use in training a discriminator neural network. At 308, the discriminator neural network can be applied to either the second geomagnetic map or the real geomagnetic map to provide a respective metric indicative of whether the map provided at the input of the discriminator neural network appears authentic. In this manner, over a series of trials, the discriminator neural network is refined using a corpus of training data to perform discrimination between real geomagnetic map data and synthesized geomagnetic map data. At 310, the generator neural network can be refined based on whether the discriminator network is indicating that a synthesized second geomagnetic map from the generator neural network is authentic or not (e.g., an "adversarial" term in a loss function based on the discriminator network output). This process is generally iterative as indicated by the loop 324, where a corpus of different lower-resolution input maps can be provided at 302, with corresponding authentic vs. inauthentic (e.g., "real" vs. "fake" determinations) being used to refine the generator neural network. Other loss functions can be used to refine the generator neural network, such as based on a difference between input and output images to be sure that image details from the input image to the generator neural network are preserved.

A refined (e.g., trained) generator neural network can be instantiated in a vehicular control application, such as forming a portion of a control system or state estimator as discussed above. In this context, at 302, data representing a first geomagnetic map can be received, such as representing at least a portion of an intended route or trajectory plan, and at 304, the generator neural network can generate a second geomagnetic map having greater spatial resolution that the first geomagnetic map used as an input to the generator neural network. At 314, optionally, other sensor data can be received such as corresponding to optical odometry or inertial measurements, as illustrative examples. At 316, a locus in the second geomagnetic map can be determined, such as corresponding to the received sensor data (e.g., a locus defined by a nearest equi-magnetic field contour corresponding to the higher-resolution second geomagnetic map). At 318, one or more state variables can be determined, based on the determined locus, and at 320, vehicular control data can be generated based on the one or more state variables. For example, the one or more state variables can include a position, or velocity (e.g., from successive position estimates) and the vehicular control data can include a steering or attitude command generated in response to a position or velocity determination. One or more of these operations can be performed in a loop 326 to provide ongoing geomagnetic-aided navigation. In this manner, vehicular control data can be updated.

Figure 4A:
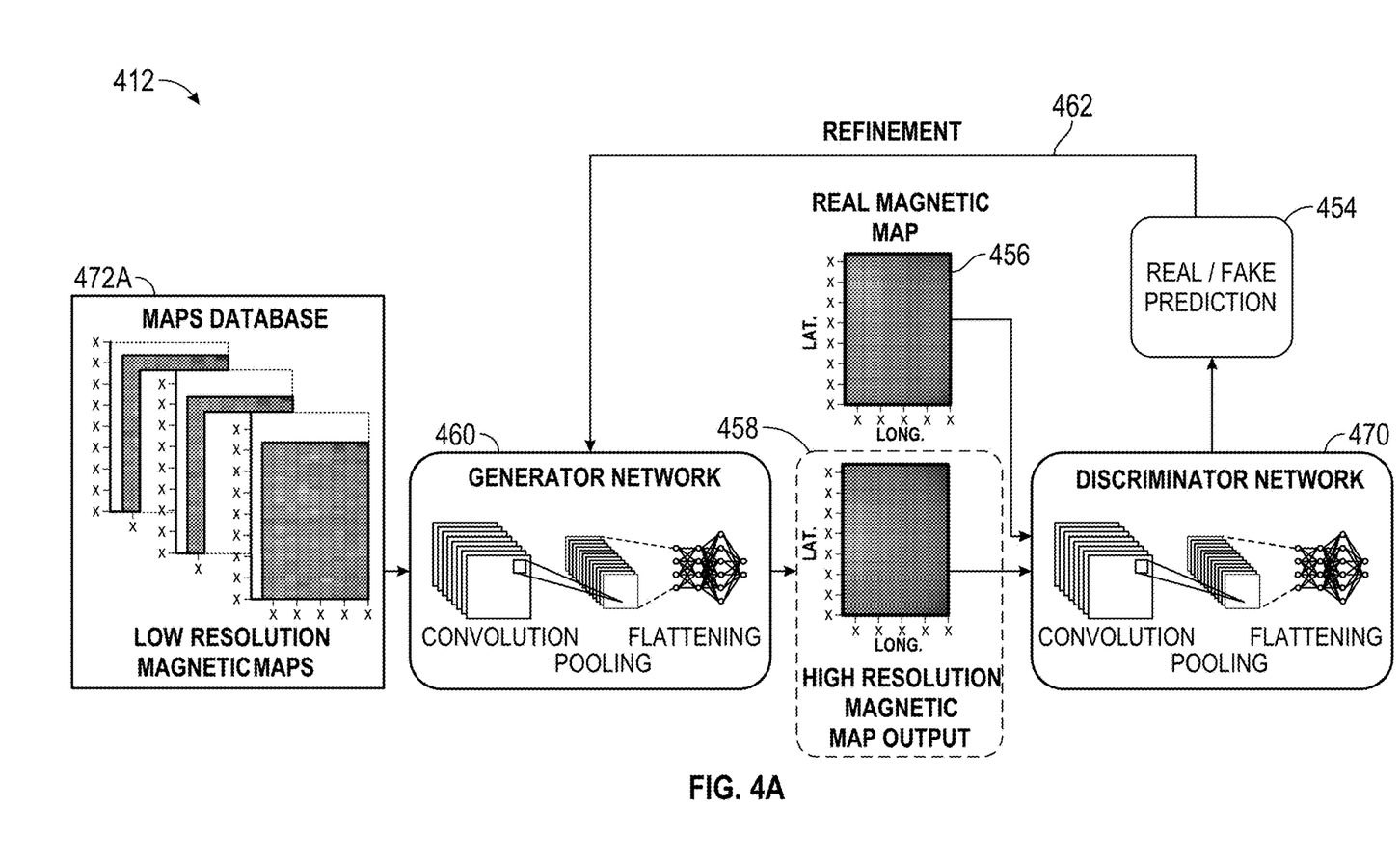
FIG. 4A illustrates generally an architecture for a geomagnetic map generator, including elements to train a generator neural network, where the generator neural network can be used for providing an enhanced (e.g., higher-resolution) geomagnetic map based on a lower-resolution source map.

FIG. 4A illustrates generally an architecture 412 for a geomagnetic map generator, including elements to train a generator neural network 460, where the generator neural network 460 can be used for providing an enhanced (e.g., higher-resolution) geomagnetic map 458 based on a lower-resolution source map. Generally, the architecture 412 can leverage pre-processed low-resolution maps 472A corresponding, for example, to a target mission area, enhancing this data set using the generator neural network 460. The generator neural network 460 can be refined based on feedback 462 from a discriminator neural network 470 that has been trained to differentiate between a real (e.g., "ground truth") higher-resolution geomagnetic map 456 versus a synthesized geomagnetic map 458 from the generator neural network 460. The output of the discriminator neural network 470 can be a metric 454 indicative of whether the input map provided to the discriminator neural network 470 is classified as "real" (e.g., seemingly authentic) or "fake."

The topology of the architecture 412 can be realized using a Super Resolution Generative Adversarial Network (SR-GAN) implementation. In the illustrative examples shown below as simulations, the map data was processed as normalized magnetic anomaly intensities in a two-dimensional matrix format rather than in image form. Accordingly, the maps were represented as two-dimensional matrices, and a VGG19 gradient loss was removed from the optimization of the generator neural network 460 in the architecture 412 as shown in FIG. 4A, as was RGB image-based processing. For training of the discriminator neural network 470, a Mean Squared Error (MSE) loss function replaced a Binary Cross Entropy loss function.

Figure 4B:
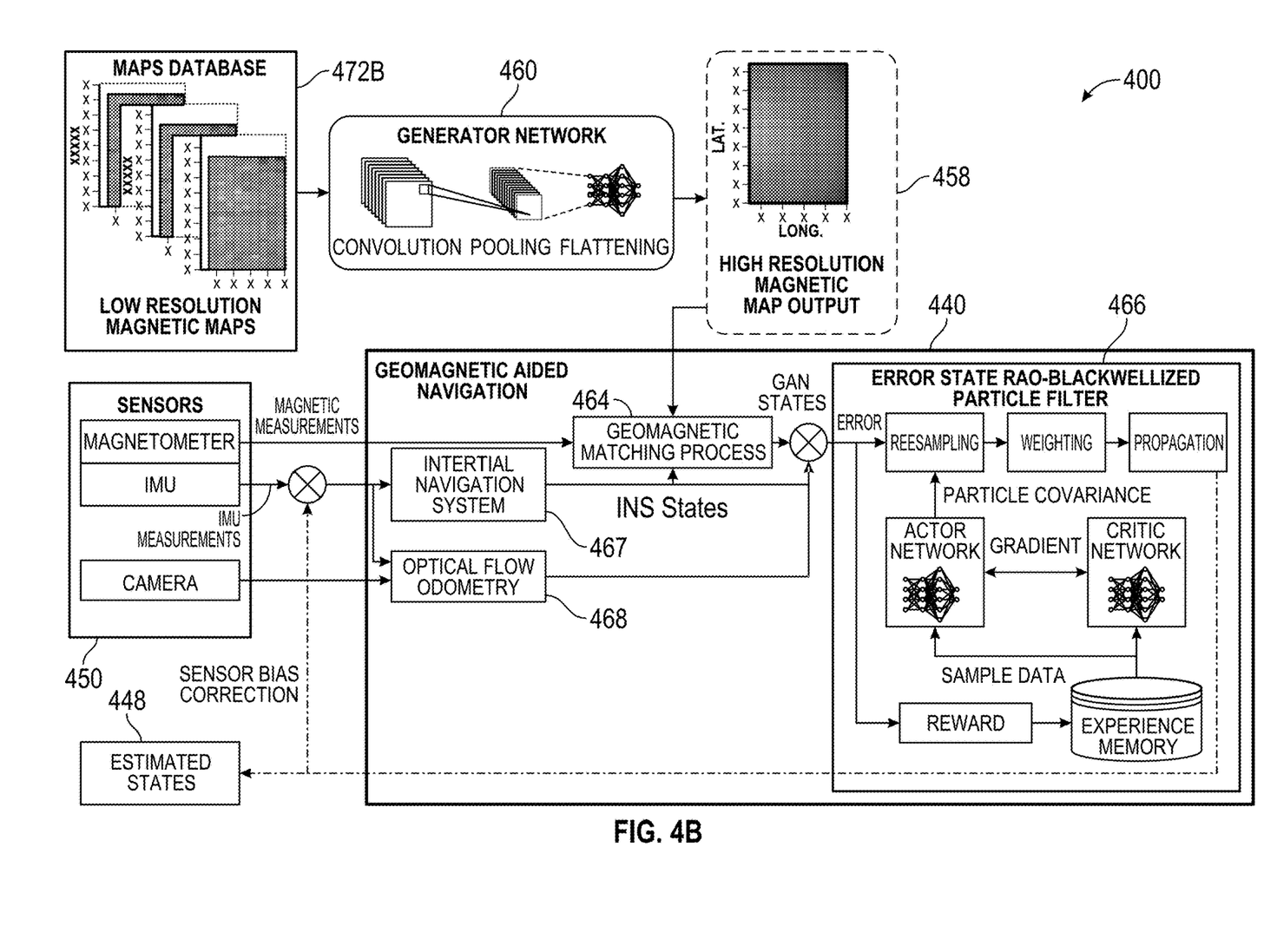
FIG. 4B illustrates generally an architecture for system that can perform geomagnetic-aided navigation, such as using the generator neural network of FIG. 4A.

FIG. 4B illustrates generally an architecture 400 for system that can perform geomagnetic-aided navigation, such as using the generator neural network 460 established using the adversarial training topology of FIG. 4A. The architecture 400 can include a geomagnetic-aided navigation element 440 that uses use a stochastic fusion filter 466 that integrates data from, as an illustrative example, a precision 9-degrees of freedom Inertial Measurement Unit (IMU) (such as amongst multiple sensors 450), real-time geomagnetic estimation systems, and deep-learning data-driven systems for improved position tracking. For example, the approach shown in FIG. 4B can include use of a position fix from a GNSS, but such an architecture can continue to provide navigational control, such as when GNSS is unavailable due to environmental conditions or active denial of service. The architecture 400 can be decentralized, such as organized using parallel sensor-dedicated local filters plus a combining filter. In this case, an international navigation system (INS 467), geomagnetic matching process 464, and other data-driven subsystems such as an optical flow odometry state estimator 468 can independently generate local state estimates. Such outputs can be aggregated and evaluated by a master stochastic filter to determine estimates states 448 such as vehicle position, velocity, or errors representative thereof in view of a specified trajectory or navigational plan.

Generally, a navigation system can provide enhanced estimation accuracy if a velocity state is available. In the absence of a reliable initial guess from the INS 467, a precise velocity vector can be used to correct position tracking or adjust drift that may appear in the system. In the example of FIG. 4B, the optical flow odometry state estimator 468 can provide velocity measurements at high update rates. Optical Flow (OF) is generally implemented to compare features identified in multiple frames taken from a single, calibrated camera. By comparing respective frames, the optical flow odometry state estimator 468 can compute the change in the camera location between frames, up to a scaling factor. As an illustration, indoor settings may offer a rich set of features that can be detected and tracked by an OF technique. The architecture 400 does not rely on optical flow odometry state estimator 468 as the primary navigation element, but use of the optical flow odometry state estimator 468 can be used to augment state estimates from other portions of the architecture 400, such as to enhance precision or reduce bias.

The geomagnetic matching process 464 can perform or otherwise include an iterated closest contour point technique as a baseline approach for the geomagnetic matching process. For example, a closest contour point technique can include automated selection by the process of candidate loci for where the vehicle may be located based on measured magnetic field intensity (such as along a contour of equal magnetic field intensity indicated by a geomagnetic map), and a position along a respective contour closest to other indicia of position from other sensors can then be selected or otherwise fused with the other indicia, such as by a probability data association technique. As an illustration, the geomagnetic matching process can search for a contour in a digital representation of a geomagnetic map that most closely matches the field measured by an on-board magnetometer. The location along the identified contour closest to a presumed position of the vehicle is identified and fused with other indicia of position.

A particle-filter based approach can be used for overall state estimation based on input derived from the respective sensors 450 and geomagnetic matching process 464. In a statistical sense, if a magnetic field is sampled (e.g., measured) enough times, there will be a measurement that falls close to an ideal value. Therefore, the proposed technique can be self-trained to provide information regarding corrections to specific feature values and learn an optimal policy to adjust the covariance associated with a matching algorithm. For example, as shown in FIG. 4B, a Rao-Blackwellized Particle Filter can be used to implement a deep deterministic policy gradient-based deep-reinforcement learning approach as a stochastic fusion filter 466. The stochastic fusion filter 466 can automate selection of a covariance for particle resample within the sensor fusion architecture, such as shown illustratively below in the examples of FIG. 5A and FIG. 5B, which represent populations of estimated positions (but such a particle filtering approach could also be used for compiling estimated state variables corresponding to particles representative of variables other than position).

Figure 5A:
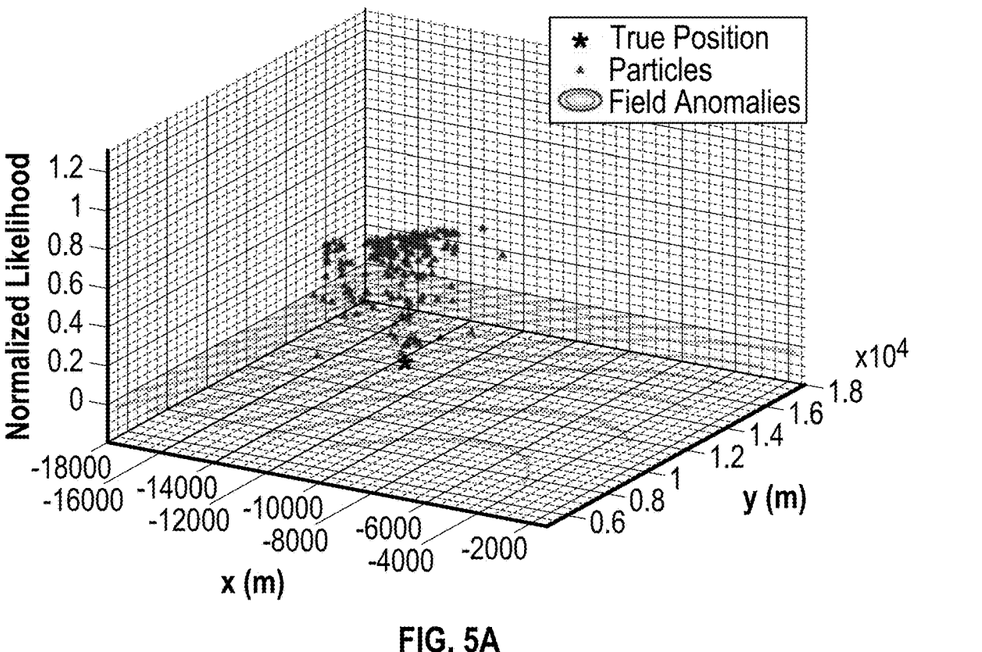
FIG. 5A illustrates generally an example of particles corresponding to different candidate positions output from a sensor fusion approach where a random covariance exists.
Figure 5B:
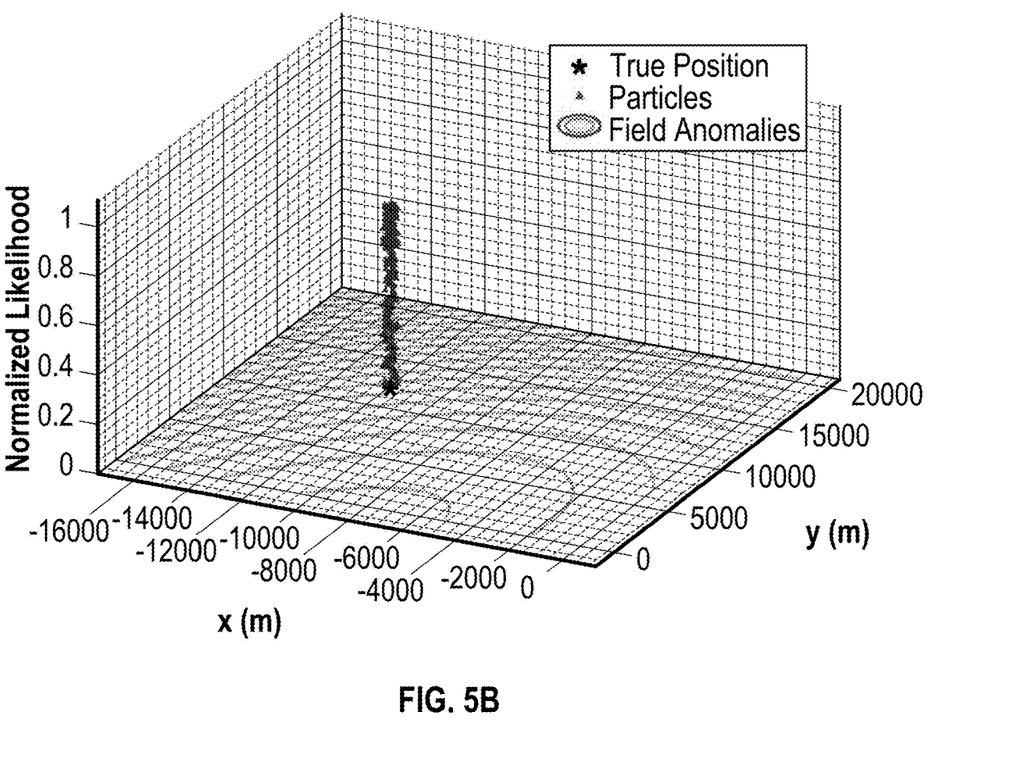
FIG. 5B illustrates generally an example of particles corresponding to different candidate positions from the sensor fusion approach where covariance is adjusted to conform to a true covariance.

FIG. 5A illustrates generally an example of particles corresponding to different candidate positions output from a sensor fusion approach where a random covariance exists, and FIG. 5B illustrates generally an example of particles corresponding to different candidate positions from the sensor fusion approach where covariance is adjusted to conform to a true covariance.

In an approach as shown herein, a position or other state estimator can use a particle filtering technique supported by a deep reinforcement learning technique for adaptive covariance adjustments as a portion of the sensor fusion topology. Such an approach can enhance state estimation accuracy by automatically learning in real-time an optimal policy to select a covariance for particle re-sample within a particle filter. Generally, a particle filter can represent different state estimates using a set of "particles," each corresponding to a hypothetical or candidate state value (e.g., a position). These particles are propagated over time by sampling from predictive motion or measurement models. Given the statistical nature of this sampling process, some particles will be more consistent with actual measurement than others. To focus on the more promising particles, a re-sampling operation can be performed which can eliminate particles having low importance weights from the population, and such a process can include replicating particles having higher weights.

A covariance associated with such re-sampling can be used to control how the particles are re-distributed. With a large covariance, the particles will be scattered more widely (as shown illustratively in FIG. 5A), while a smaller covariance will more tightly cluster them (as shown illustratively in FIG. 5B). Generally, an optical covariance corresponds to a "true" uncertainty of a system. If a covariance associated with re-sampling is too large, particles will be spread too diffusely, decreasing accuracy. If a selected covariance is too small, particles will collapse together, losing diversity. The approach used in the architecture of FIG. 413 can seek an optimal covariance for particle re-sampling in a position estimate (or other state variable estimate). The particle filter can be implemented to conduct trials using different covariance values and evaluating a resulting localization accuracy. In this manner, the approach shown in FIG. 413 learns over time which covariance values produce better state estimates. Such an approach can adapt or converge more closely on a true system uncertainty, even if unknown a priori. The simulation results of FIG. 5B illustrate generally that selecting a more suitable covariance within a stochastic sensor fusion will lead to a higher probability that an estimated geomagnetic localization will fall within a correct area distribution.

Figure 6A:
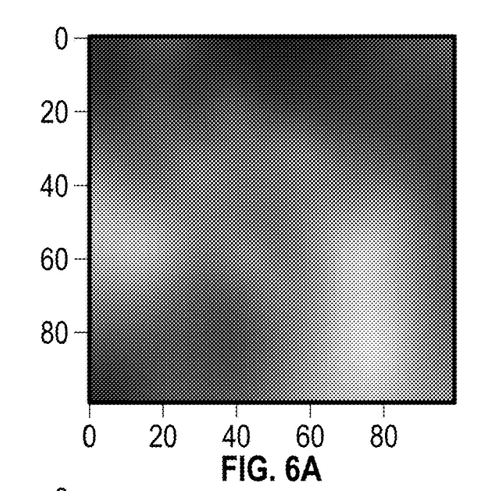
FIG. 6A, FIG. 6B, and FIG. 6C show two-dimensional geomagnetic maps where FIG. 6A corresponds to a low-resolution map from a mathematical model and FIG. 6C corresponds to a map from a higher-resolution survey (e.g., "ground truth,"), with FIG. 6B showing the output of applying the SRGAN approach to FIG. 6A.
Figure 6B:
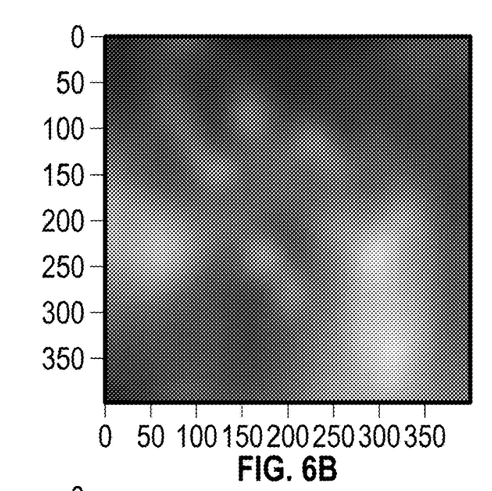
Figure 6C:
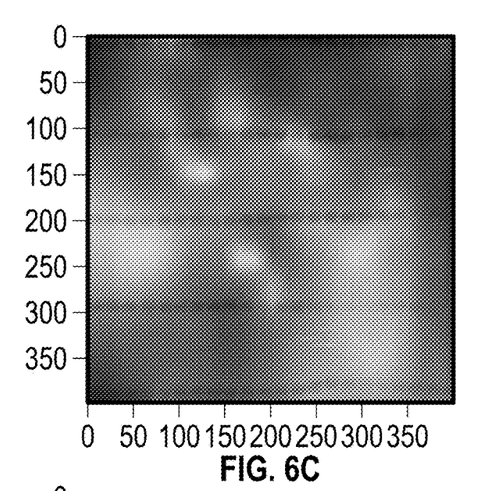
Figure 7A:
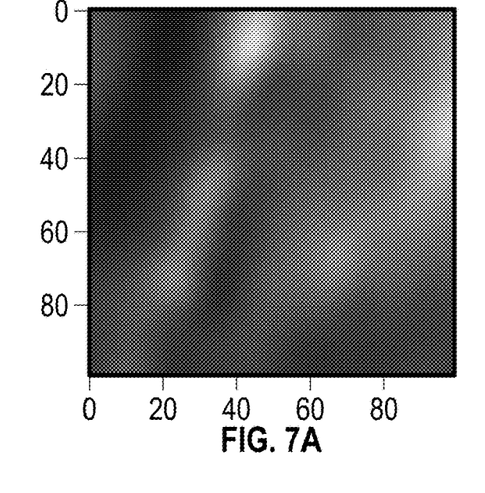
FIG. 7A, FIG. 7B, and FIG. 7C show two-dimensional geomagnetic maps where FIG. 7A corresponds to a low-resolution map from a mathematical model and FIG. 7C corresponds to a map from a higher-resolution survey (e.g., "ground truth,"), with FIG. 7B showing the output of applying the SRGAN approach to FIG. 7A.
Figure 7B:
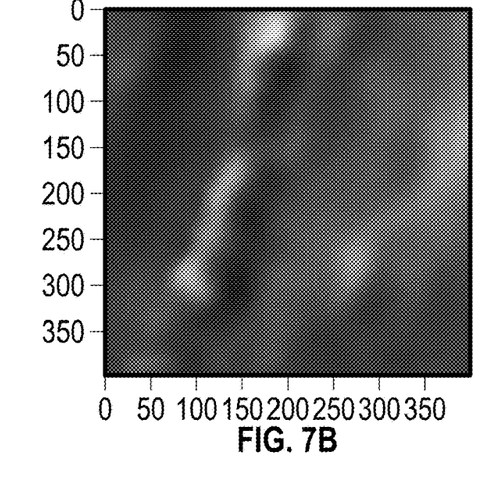
Figure 7C:
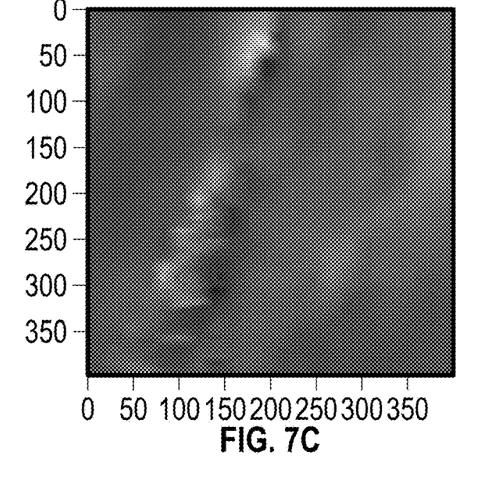

FIG. 6A, FIG. 6B, and FIG. 6C show two-dimensional geomagnetic maps where FIG. 6A corresponds to a low-resolution map from a mathematical model and FIG. 6C corresponds to a map from a higher-resolution survey (e.g., "ground truth,"), with FIG. 6B showing the output of applying the SRGAN approach to FIG. 6A. FIG. 6B generally correlates with features shown in FIG. 6C, and the images of FIG. 6A and FIG. 6C were not used in the corpus of training data used to establish the generator neural network in the SRGAN instance used for generation of FIG. 6B. FIG. 7A, FIG. 7B, and FIG. 7C show two-dimensional geomagnetic maps where FIG. 7A corresponds to a low-resolution map from a mathematical model and FIG. 7C corresponds to a map from a higher-resolution survey (e.g., "ground truth,"), with FIG. 7B showing the output of applying the SRGAN approach to FIG. 7A. FIG. 7B generally correlates with features shown in FIG. 7C, and the images of FIG. 7A and FIG. 7C were not used in the corpus of training data used to establish the generator neural network in the SRGAN instance used for generation of FIG. 7B. Resolution enhancement as shown illustratively in FIG. 6B and FIG. 7B was carried out by a Generative Adversarial Network (GAN) architecture trained using low resolution geomagnetic datasets from the EMAG2 model ("Earth Magnetic Anomaly Grid 2-arc-minute resolution available from the Nation Centers for Environmental Information, National Oceanic and Atmospheric Administration), and high-resolution airborne surveys available from public domain are shown in the corresponding figures, FIG. 6C and FIG. 7C, for comparison.

Figure 8A:
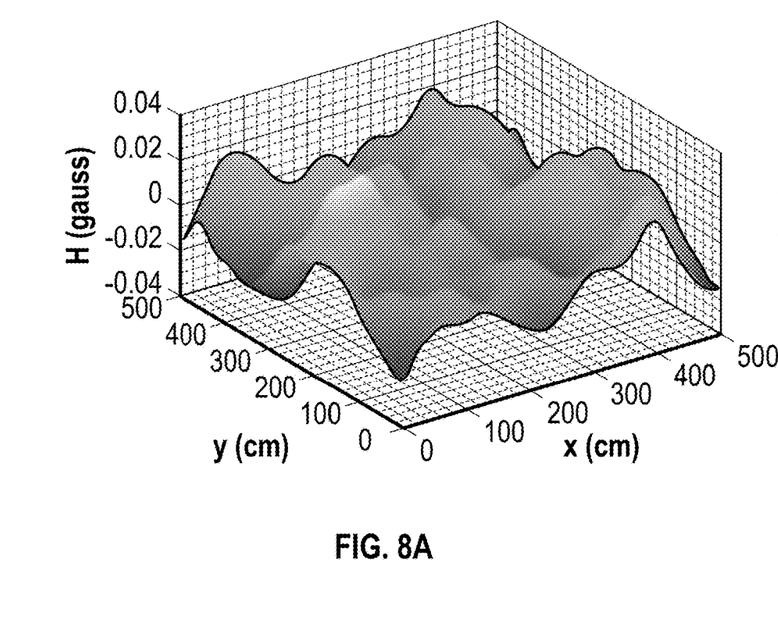
FIG. 8A and FIG. 8B illustrate respective views of magnetic field data, with FIG. 8B showing respective contours of equal magnetic field intensity ("equi-magnetic" field contours), with such intensity indicated by different shades.
Figure 8B:
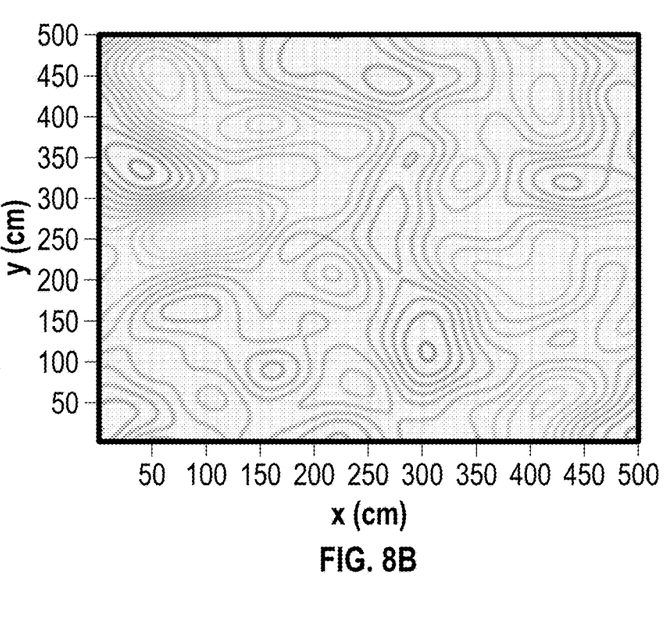

FIG. 8A and FIG. 8B illustrate respective views of magnetic field data, with FIG. 8B showing respective contours of equal magnetic field intensity, with such intensity indicated by different shades. As discussed above, higher-resolution geomagnetic maps (or data corresponding thereto) will have richer features (e.g., more information at higher spatial frequencies), which can enhance performance of a closest-contour technique. As shown in FIG. 8B, more variation at higher spatial frequencies results in more spatially-confined equi-magnetic contours over the area defined by the map. Accordingly, if a candidate vehicle position is mapped to a nearest contour, candidate loci are more tightly confined, leading to lower error in position estimation as compared to that based on more coarse data.

Figure 9:
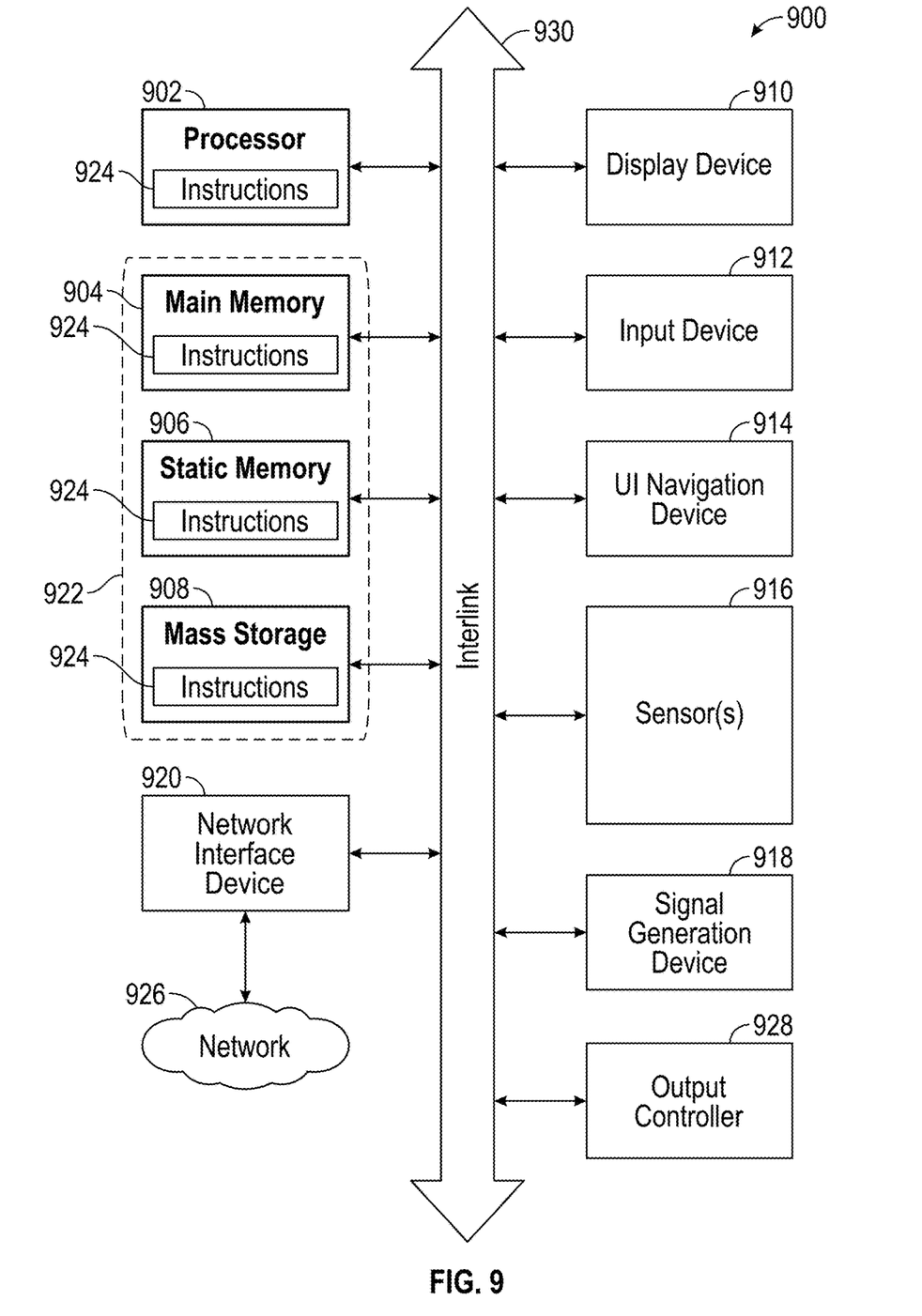
FIG. 9 illustrates a block diagram of an example comprising a machine upon which any one or more of the techniques (e.g., methodologies) discussed herein may be performed.

FIG. 9 illustrates a block diagram of an example comprising a machine 900 upon which any one or more of the techniques (e.g., methodologies) discussed herein may be performed. Machine 900 (e.g., computer system) may include a hardware processor 902 (e.g., a central processing unit (CPU), a graphics processing unit (GPU), a hardware processor core, or any combination thereof), a main memory 904 and a static memory 906, connected via an interlink 930 (e.g., link or bus), as some or all of these components may constitute hardware for systems or related implementations discussed above.

Specific examples of main memory 904 include Random Access Memory (RAM), and semiconductor memory devices, which may include storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912, and UI navigation device 914 may be a touch-screen display. The machine 900 may include a mass storage device 908 (e.g., drive unit), a signal generation device 918 (e.g., a speaker), a network interface device 920, and one or more sensors 916, such as a global positioning system (GPS) sensor, compass, accelerometer, or some other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 908 may comprise a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 908 comprises a machine readable medium.

Specific examples of machine-readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine-readable medium is illustrated as a single medium, the term "machine readable medium" may include a single medium or multiple media (e.g., a centralized or distributed database, or associated caches and servers) configured to store the one or more instructions 924.

An apparatus of the machine 900 includes one or more of a hardware processor 902 (e.g., a central processing unit (CPU), a graphics processing unit (GPU), a hardware processor core, or any combination thereof), a main memory 904 and a static memory 906, sensors 916, network interface device 920, antennas, a display device 910, an input device 912, a UI navigation device 914, a mass storage device 908, instructions 924, a signal generation device 918, or an output controller 928. The apparatus may be configured to perform one or more of the methods or operations disclosed herein.

The term "machine readable medium" includes, for example, any medium that is capable of storing, encoding, or carrying instructions for execution by the machine 900 and that cause the machine 900 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine-readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 924 may be transmitted or received, for example, over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 920 includes one or more physical jacks (e.g., Ethernet, coaxial, or other interconnection) or one or more antennas to access the communications network 926. In an example, the network interface device 920 includes one or more antennas to wirelessly communicate using at least one of single-input multiple-output (SIMO), multiple-input multiple-output (MIMO), or multiple-input single-output (MISO) techniques. In some examples, the network interface device 920 wirelessly communicates using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

VARIOUS NOTES

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A machine-implemented method, comprising:
receiving data representing a first geomagnetic map;
applying a generator neural network to the received data representing the first geomagnetic map to generate a second geomagnetic map having a spatial resolution greater than the first geomagnetic map;
using the second geomagnetic map, determining indicia of a position of a vehicle; and
generating vehicular control data.

2. The machine-implemented method of claim 1, updating vehicular control data to adjust a trajectory of the vehicle based on the determined indicia of the position of the vehicle.

3. The machine-implemented method of claim 1, wherein the determining the indicia of the position of the vehicle includes using data derived from one or more sensors and the second geomagnetic map.

4. The machine-implemented method of claim 3, wherein the data derived from the one or more sensors comprise odometry data from an optical sensor or a position fix established using a global navigation satellite system (GNSS) sensor.

5. The machine-implemented method of claim 3, wherein the data derived from the one or more sensors comprises an estimated state variable established in least in part using an inertial navigation system (INS).

6. The machine-implemented method of claim 3, wherein generating the vehicular control data comprises determining an estimated state variable using a fusion of data derived from one or more sensors and a locus of the vehicle determined using the second geomagnetic map.

7. The machine-implemented method of claim 6, wherein the fusion of data comprises determining a difference representative of an error between indicia of the position of the vehicle as indicated by the data derived from the one or more sensors as compared to the determined locus in the second geomagnetic map.

8. The machine-implemented method of claim 6, wherein the determined locus in the second geomagnetic map corresponds to a position at or near an equi-magnetic field contour.

9. The machine-implemented method of claim 6, wherein the determining the estimated state variable includes using a particle filter, including controlling a covariance associated with a distribution of candidate positions as indicated by the particle filter.

10. The machine-implemented method of claim 9, wherein the particle filter comprises Rao-Blackwellized particle filter; and
wherein the determining the estimated state variable comprises compiling a population of estimated state variables corresponding to different particles modeled by the particle filter, the different particles corresponding to different candidate loci.

11. The machine-implemented method of claim 1, wherein the first geomagnetic map comprises a normalized magnetic anomaly map based on a geomagnetic survey.

12. The machine-implemented method of claim 11, wherein the first geomagnetic map and the second geomagnetic map comprise respective two-dimensional matrix representations of normalized magnetic anomaly data.

13. The machine-implemented method of claim 11, wherein the normalized magnetic anomaly map comprises a mathematical representation of magnetic anomaly data samples of the geomagnetic survey.

14. The machine-implemented method of claim 1, wherein the generator neural network is established using an adversarial network training topology to form a generative adversarial network (GAN), the adversarial network training topology comprising a discriminator neural network to generate an indication as to whether a candidate second geomagnetic map provided by the generator neural network is classified as authentic or fake, the candidate second geomagnetic map having a spatial resolution greater than the first geomagnetic map received by the generator neural network.

15. The machine-implemented method of claim 14, wherein the indication as to whether a candidate second geomagnetic map provided by the generator neural network is authentic or fake is used to refine the generator neural network.

16. A machine-implemented method for training a generator neural network using a generative adversarial network (GAN) topology, the machine-implemented method comprising:
- receiving data representing a group of first geomagnetic maps;
- applying the generator neural network to respective ones of the first geomagnetic maps to generate respective second geomagnetic maps having a spatial resolution greater than corresponding ones of the first geomagnetic maps; and
- applying the respective second geomagnetic maps to a discriminator neural network to generate an indication as to whether a respective second geomagnetic map provided by the generator neural network is classified as authentic or fake;
- wherein the discriminator neural network is established using training data comprising authentic geomagnetic maps; and
- wherein the generator neural network is iteratively refined in response to respective indications as to whether the respective second geomagnetic maps are classified as authentic or fake by the discriminator neural network.

17. The machine-implemented method of claim 16, wherein the first geomagnetic map comprises a normalized magnetic anomaly map based on a geomagnetic survey.

18. The machine-implemented method of claim 16, wherein the first geomagnetic map and the second geomagnetic map comprise respective two-dimensional matrix representations of normalized magnetic anomaly data.

19. A system, comprising:
- at least one processor circuit;
- at least one memory circuit coupled to the processor circuit, the memory circuit comprising instructions that cause the at least one processor circuit to instantiate a state estimator, the instructions comprising instructions to:
  - receive data representing a first geomagnetic map;
  - apply a generator neural network to the received data representing the first geomagnetic map to generate a second geomagnetic map having a spatial resolution greater than the first geomagnetic map;
  - using the second geomagnetic map, determine indicia of a position of a vehicle; and
  - in response, generate an estimated state variable for use in controlling the vehicle.

20. The system of claim 19, wherein the system comprises a vehicular control system to receive the estimated state variable, and to generate one or more of a command to adjust an attitude of the vehicle or a command to adjust a steering of the vehicle.

* * * * *